(12) United States Patent
Kato

(10) Patent No.: US 6,301,441 B1
(45) Date of Patent: Oct. 9, 2001

(54) LENS DRIVING DEVICE

(75) Inventor: Tetsuaki Kato, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/660,358

(22) Filed: Sep. 12, 2000

(30) Foreign Application Priority Data

Sep. 13, 1999 (JP) .................................................. 11-258811

(51) Int. Cl.$^7$ .............................. G03B 3/10; G03B 13/34
(52) U.S. Cl. .......................... 396/131; 396/135; 396/137
(58) Field of Search .................................... 396/131, 135, 396/136, 137, 133; 352/140; 348/345

(56) References Cited

U.S. PATENT DOCUMENTS

| 4,851,869 | * | 7/1989 | Ishimaru et al. ...................... 396/131 |
| 5,448,328 | | 9/1995 | Suzuki et al. . |
| 5,918,078 | * | 6/1999 | Imura et al. .......................... 396/137 |

FOREIGN PATENT DOCUMENTS

| 5-215954 | 8/1993 | (JP) . |
| 5-268777 | 10/1993 | (JP) . |
| 6-11636 | 1/1994 | (JP) . |
| 10160998 | 6/1998 | (JP) . |

* cited by examiner

*Primary Examiner*—Russell Adams
*Assistant Examiner*—Rochelle Blackman
(74) *Attorney, Agent, or Firm*—Greenblum & Bernstein, P.L.C.

(57) ABSTRACT

A lens driving device for driving a focusing lens of a photographing lens for a camera is provided with a focusing ring that is rotated to move the focusing lens, an AF motor and an MF (manual focusing) ring. Each of the AF motor and the MF ring is connected to the focusing ring to rotate the same. The AF motor is driven to rotate. The MF ring is operable even when the AF motor is rotated. The device is further provided with a first detector that detects a driving amount of the focusing lens, a second detector that detects a driving speed of the AF motor, and a speed controller that controls a driving speed of the AF motor in accordance with detection outputs of the first and second detector.

6 Claims, 8 Drawing Sheets

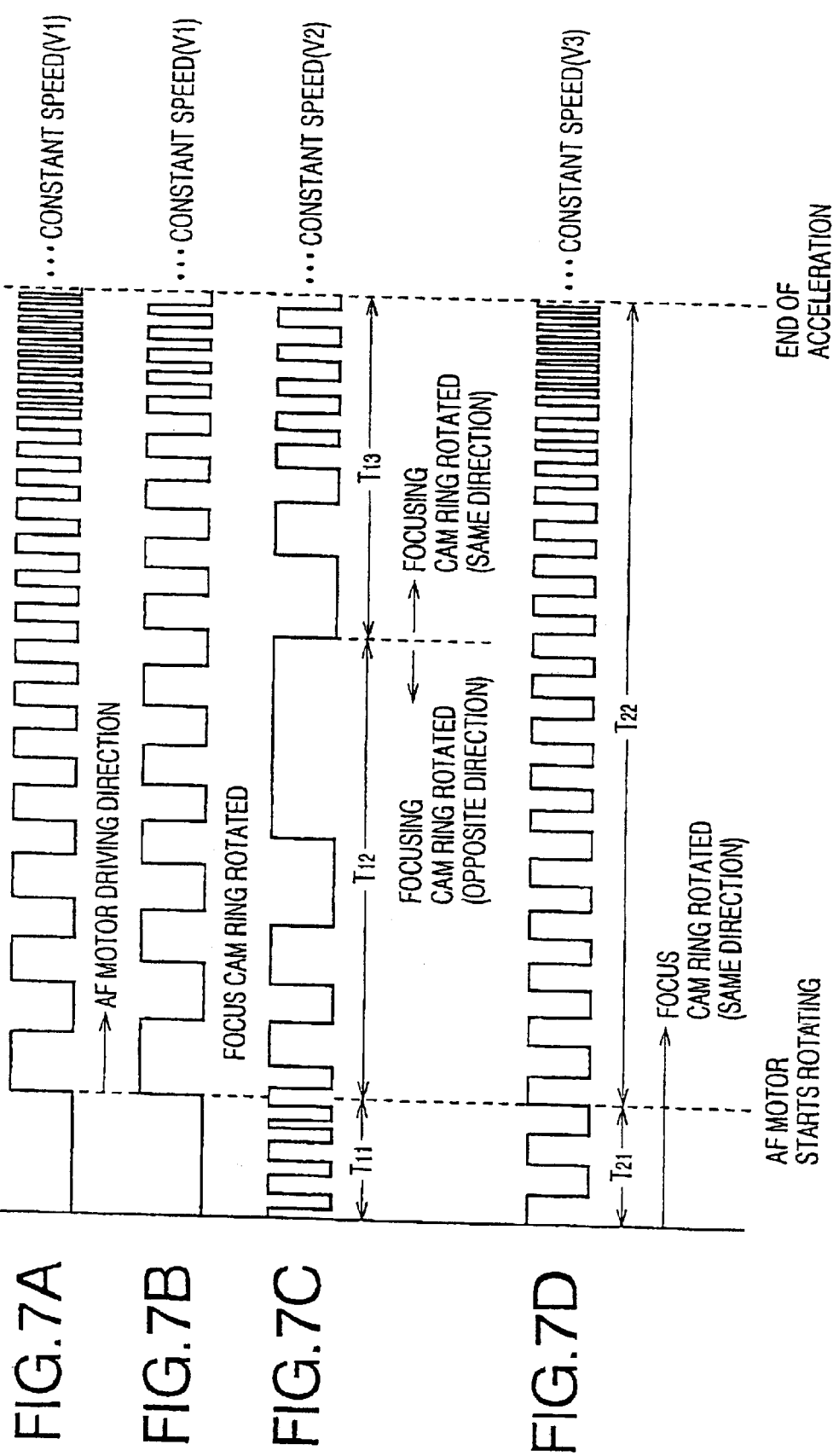

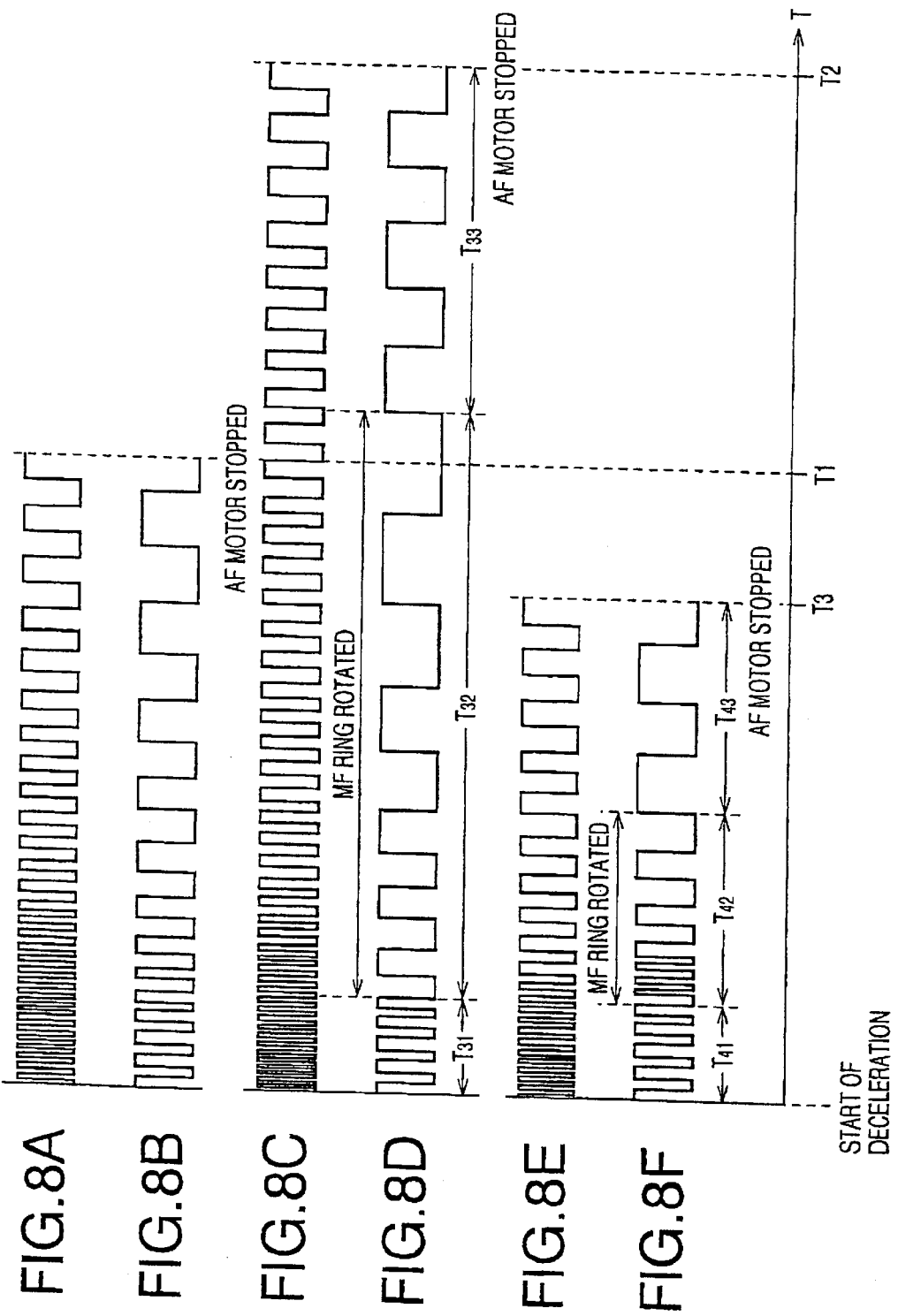

LENS DRIVING DEVICE

BACKGROUND OF THE INVENTION

The present invention relates to a lens driving device employed in cameras and/or video cameras for driving a lens to move. More particularly, the present invention relates to a lens driving device for controlling the movement of a focusing lens, which can be moved manually even when it is moved for an automatic focusing.

In an AF (automatic focusing) system for a camera, a photographing lens, with which an automatic focusing operation can be performed, is controlled such that a position, along an optical axis, of a focusing lens (which may be a group of lens elements) included in the photographing lens is detected, and then the focusing lens is controlled to move to an in-focus position based on a distance to an object that is measured by a distance measuring device of the camera.

In an example of such an AF system, in order to detect the position of the focusing lens, an actuator which outputs a pulse signal in response to the movement of the focusing lens is provided. By counting the number of pulses included in the pulse signal, the lens position is detected.

Such an actuator is generally provided with a focusing motor, and a focusing cam ring, which is rotated by the focusing motor. The focusing cam ring is formed with cam grooves, to which cam followers provided to the focusing lens (or a lens barrel thereof) are engaged. As the focusing cam ring is rotated by the focusing motor, the focusing lens is driven to move along the optical axis thereof due to the engagement of the cam grooves with the cam followers. The actuator is further provided with a pulse encoder which generates a pulse signal in response to the rotational movement of the focusing cam ring.

When the focusing lens is driven to start moving, the moving speed of the focusing lens is controlled by controlling the rotation speed of the focusing motor so that the focusing lens quickly starts moving and smoothly. When the focusing lens is to be stopped, the moving speed thereof is controlled so that the focusing lens does not run past a destination, nor stop in front of the destination.

For example, at an initial stage of the movement, the focusing motor is driven to rotate at a relatively slow speed, and the speed is accelerated until it reaches a predetermined constant speed. Thereafter, the motor is controlled to keep rotating at the predetermined constant speed. When the lens approaches the destination, or a target position, the rotation speed of the focusing motor is gradually decelerated, and finally, the focusing motor is stopped.

Recently, a photographing lens allowing a user to manually move the focusing lens even when the automatic focusing is performed (i.e., the focusing lens is being moved by the AF system) has been developed. Example of such a lens is described in Japanese Patent Provisional Publication No. HEI 5-215954. In this publication, a lens includes an AF actuator for the automatic focusing, and a manually operable ring for manual focusing. Both of them are connected to a focusing cam ring through a frictionally connecting mechanism. With this construction, even when the focusing lens is moved by the AF actuator, by operating the MF ring, the user can move the focusing lens manually. In such a system, if the focusing lens is manually moved when it is moved by the AF system, correlation between the rotation speed of the focusing motor and moving amount of the focusing lens is changed, and therefore, it becomes impossible to control the moving speed of the focusing lens appropriately.

For example, a case in which the focusing lens is started to move and accelerated will be considered. It is assumed that the pulse signal, which is referred to and used for controlling the movement of the focusing lens, from the focusing cam ring is used as moving speed data, and the focusing cam ring is to be rotated at a certain target speed.

If the MF ring is rotated in the same direction as the focusing cam ring, the speed of the focusing motor is lowered in comparison to a case where the MF ring is not operated. For example, when the focusing motor is driven such that the focusing lens moves toward an object, if the MF ring is operated to move the focusing lens in the same direction, the encoder outputs the pulse signal having a higher frequency. Therefore, the AF actuator lowers the rotation speed of the focusing motor so as to lower the rotation speed of the focusing cam ring. If the MF operation is abruptly stopped under this condition, the speed of the focusing cam ring has become slower than the expected speed since the focusing motor has been lowered.

If the MF ring is operated in the direction opposite to that of the focusing motor, the speed of the focusing motor is higher than a case where the MF ring is not operated. If the MF ring is abruptly stopped under this condition, since the focusing motor is rotated at the higher speed at that instance, the focusing cam ring is moved at a speed higher than expected. As a result, if the MF ring is moved and abruptly stopped when the AF operation is being executed, the rotation speed of the focusing motor becomes unstable, and therefore, it becomes difficult to move the focusing cam ring at a predetermined speed to a target position quickly.

Next, a case where the focusing lens is decelerated and stopped will be considered. It is assumed that the pulse signal from the focusing cam ring is used as the moving speed data, and the speed of the focusing motor is to be lowered to a certain target speed.

If the MF ring is rotated in the same direction as the focusing cam ring rotates, the focusing motor is driven to run at a slower speed than the speed when the MF ring is not operated. If the MF ring is operated in the direction opposite to that of the focusing motor, the focusing motor is rotated at a higher speed than that when the MF ring is not operated. If the MF ring is abruptly stopped when the focusing motor is being rotated, the rotation speed of the focusing motor becomes unstable, and therefore, it becomes difficult to move the focusing cam ring at a predetermined speed to a target position quickly.

Alternatively, the pulse signal from the focus ring may be used as moving amount information, and the movement of the focusing ring can be controlled based on the moving amount information. In such a case, however, if the MF ring is rotated in a direction opposite to that of the focusing motor, rotation of the MF ring cancels the rotation of the focusing motor, which temporarily stops the rotation of the focusing motor. If the MF ring is rotated such that load to the focusing motor is decreased, the focusing motor becomes rotatable even if it should not be moved. If the MF ring is abruptly stopped, since the driving torque of the AF actuator runs short, the focusing motor is stopped. Then, no pulse is generated, and it becomes impossible to perform the AF control.

SUMMARY OF THE INVENTION

It is therefore an object of the invention to provide an improved lens driving device, with which an appropriate starting/accelerating operation and decelerating/stopping operation of a focusing lens can be performed accurately even if the MF operation is performed during the AF operation.

For the above object, according to an aspect of the invention, there is provided a lens driving device for driving a focusing lens of a photographing lens for a camera, which is provided with an actuator that is driven to move the focusing lens, the actuator including a motor, an operable member that is manually operable to move the focusing lens, the operable member being operable even when the actuator is driven to move the focusing lens, a first detector that detects a driving amount of the focusing lens, a second detector that detects a driving speed of the motor, and a speed controller that controls a driving speed of the actuator in accordance with detection outputs of the first and second detectors.

With the above configuration, since the rotation of the AF motor is controlled in accordance with the detection outputs of the first and second detector, and without referring to the moving speed of the focusing lens, the movement of the focusing lens can be controlled accurately even if the MF ring is operated during the AF operation.

According to another aspect of the invention, there is provided a lens driving device for driving a focusing lens of a photographing lens for a camera, provided with an actuator that is driven to move the focusing lens, the actuator including a motor, an operable member that is manually operable to move the focusing lens, the operable member being operable even when the actuator is driven to move the focusing lens, a first detector that detects a driving amount of the focusing lens, a second detector that detects a driving speed of the motor, and a speed controller that controls a driving speed of the actuator. With this structure, the controller controls the actuator in accordance with a detection output of the second detector when the focusing lens is started/accelerated, and the controller controls the actuator in accordance with a detection output of the first detector when the focusing lens is decelerated/stopped.

Since the controller controls the actuator in accordance with a detection output of the second detector when the focusing lens is started/accelerated, and the controller controls the actuator in accordance with detection outputs of the first and second detectors when the focusing lens is decelerated/stopped, the focusing lens can be moved accurately even if the MF operation is performed during the AF operation.

Optionally, the first detector includes a focusing ring that is rotated to move the focusing lens, and a focusing pulse encoder that outputs a pulse signal including pulses corresponding to the rotation amount of the focusing ring. Further, the controller may count the number of pulses included in the pulse signal output by the focusing pulse encoder and detects the driving amount of the focusing lens in accordance with the counted number of pulses.

Preferably, the focusing pulse encoder may output a plurality of pulse signals having different phases, and the controller may detect a driving direction of the focusing lens based on the plurality of pulse signals.

Further optionally, the second detector may include an AF (auto-focusing) pulse encoder that detects the rotation speed of the motor and outputs an AF pulse signal representing the rotation speed of the motor. Further, in this case, the controller may detect the driving speed of the actuator in accordance with the AF pulse signal.

Still optionally, the controller may detect the driving speed of the actuator in accordance with one of the number of pulses, the width of pulses, and the frequency of the AF pulse signal.

BRIEF DESCRIPTION OF THE ACCOMPANYING DRAWINGS

FIGS. 7A–7D show a timing chart illustrating the starting/accelerating operation; and FIGS. 8A–8F show a timing chart illustrating the decelerating/stopping operation.

DETAILED DESCRIPTION OF THE EMBODIMENT

Hereinafter, an AF (automatic focusing) lens driving device 1 according to an embodiment of the invention will be described with reference to the accompanying drawings.

Figure 1:
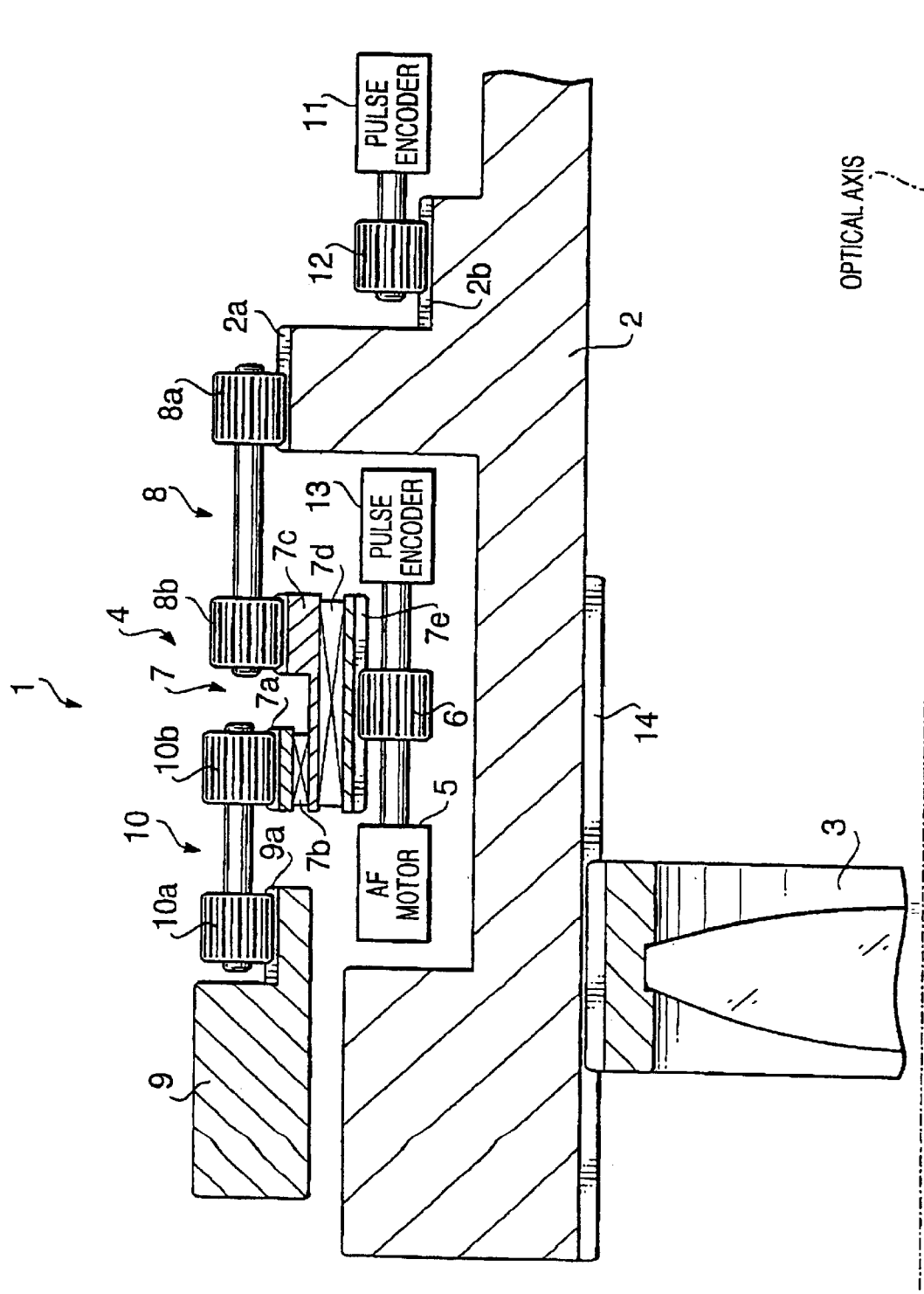
FIG. 1 is a cross-sectional view of an AF lens driving device according to an embodiment of the present invention.

FIG. 1 schematically shows a structure of the AF lens driving device 1 according to the embodiment of the present invention. The AF lens driving device 1 includes a lens barrel (not shown) in which a focusing cam ring 2 is provided. A focusing lens 3, which is to be moved for focusing, is connected to the focusing cam ring 2 via a helicoidal cam mechanism 14 such that the focusing lens 3 moves in the optical axis thereof as the focusing cam ring 2 is rotated. On the outer side of the focusing cam ring 2, an AF actuator 4 for driving the focusing cam ring 2 to rotate is provided. The AF actuator 4 includes an AF motor 5, which is a DC motor, and an AF gear 6 that is mechanically connected to the focusing cam ring driving gear 8 through a friction gear mechanism 7.

The friction gear mechanism 7 includes, from the outer side to the inner side, a first gear 7a, a first friction 7b, a second gear 7c, a second friction 7d, and a third gear 7e. A first gear 8a of a focusing cam ring driving gear 8 is engaged with a gear 2a formed on an outer surface of the focusing cam ring 2, and a second gear 8b of the focusing cam ring driving gear 8 is engaged with the second gear 7c of the friction gear mechanism 7. When the AF gear 6 rotates, the focusing cam ring driving gear 8 is rotated via the friction gear mechanism 7, thereby the focusing cam ring 2 is rotated.

On an outer side of the focusing cam ring 2, an MF (manual focusing) ring 9, which is to be manually rotated for focusing, is provided. On a portion of the outer surface of the MF ring 9, a gear 9a is formed, with which a first gear 10a of an MF gear 10 is engaged. A second gear 10b of the MF gear 10 is engaged with the first gear 7a of the friction gear mechanism 7. Thus, when the MF ring 9 is rotated, the focusing cam ring driving gear 8 is rotated, through the MF gear 10, the first gear 7a, the friction 7b, and the second gear 7c, thereby the focusing cam ring 2 is rotated.

With this structure, by rotating the AF gear 6 of the AF actuator 4 using the AF motor 5, the focusing cam ring 2 is rotated through the third gear 7e, the second friction 7d and the second gear 7c of the friction gear mechanism 7, so that the focusing lens 3 is moved in the direction of the optical axis for focusing. Further, with this structure, even when the AF motor 5 is operating, by rotating the MF ring 9, the focusing cam ring 2 can be rotated through the first gear 7a, first friction 7b and second gear 7c for performing MF operation.

The AF lens driving device 1 is further provided with a pulse encoder 11 connected to a gear 12, which is engaged with a gear 2b formed on the outer surface of the focusing cam ring 2. As the focusing cam ring 2 is rotated, the pulse encoder 11 outputs a pulse signal including pulses, the number of which corresponds to the rotation of the focusing cam ring 2. Another pulse encoder 13 is connected to the AF motor 5, and outputs a pulse signal corresponding to the rotation of the AF motor 5. Hereinafter, the pulse encoder 11 will be referred to as the focusing pulse encoder 11, and the pulse encoder 13 will be referred to as the AF pulse encoder 13.

Figure 2:
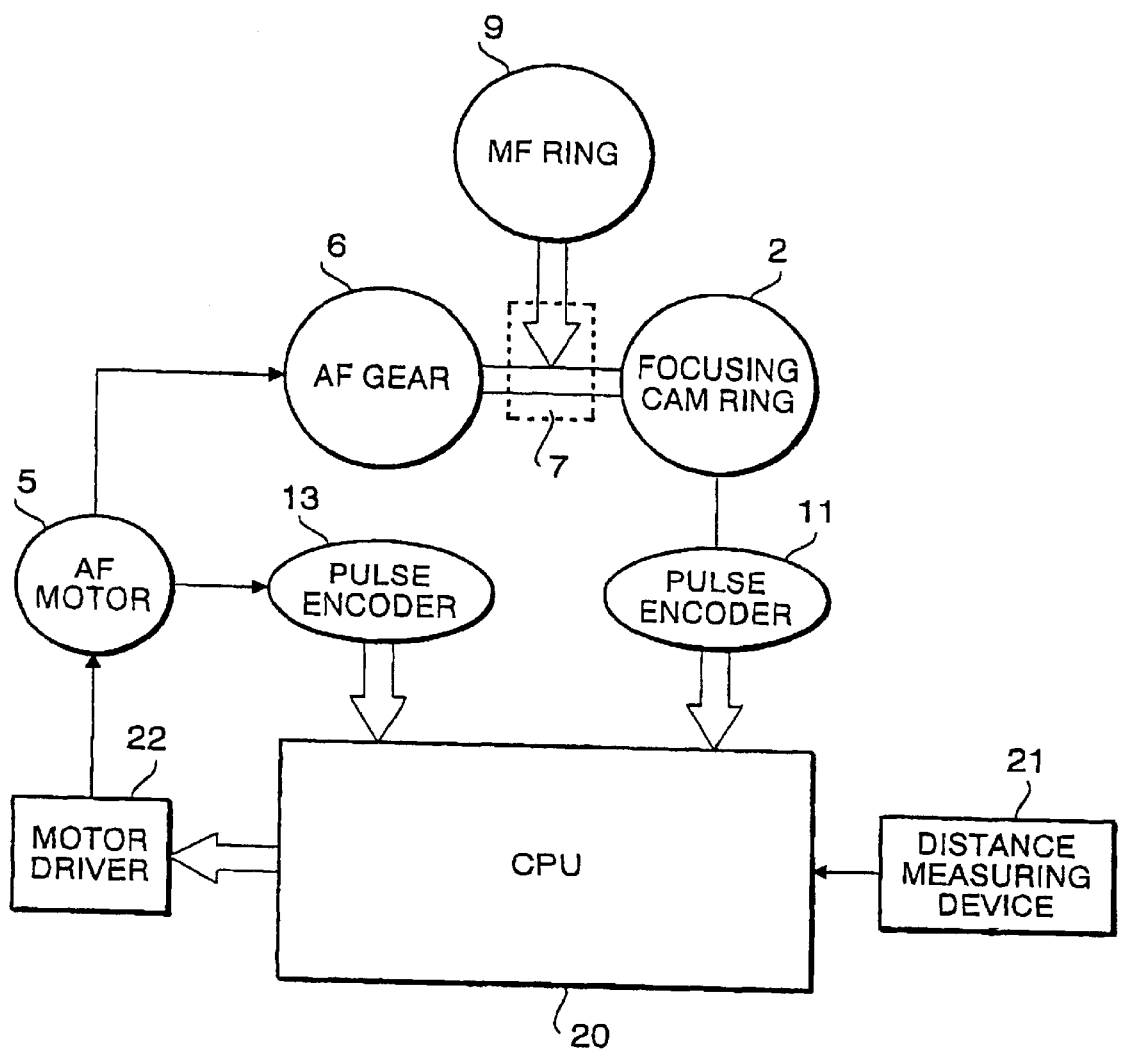
FIG. 2 is a block diagram of a main part of a lens driving system for the AF lens driving device shown in FIG. 1.

FIG. 2 is a block diagram illustrating a control system of the lens driving device 1 shown in FIG. 1.

The control system includes a CPU 20, which is provided to control a focusing operation. The CPU 20 receives distance measuring information from a distance measuring device 21 provided in a camera, and controls the focusing operation of the AF lens driving device 1 in accordance with the distance measuring information. The rotation of the AF motor 5 is controlled by a motor driver 22, which operates in accordance with a control signal transmitted from the CPU 20. The pulse signals output by the focusing and AF pulse encoders 11 and 13 are input to the CPU 20. The CPU 20 controls the AF motor 5 through the motor driver 22 based on the pulse signals received from the encoders 11 and 13.

An operation of the AF lens driving device 1 configured as above will be described.

Figure 3:
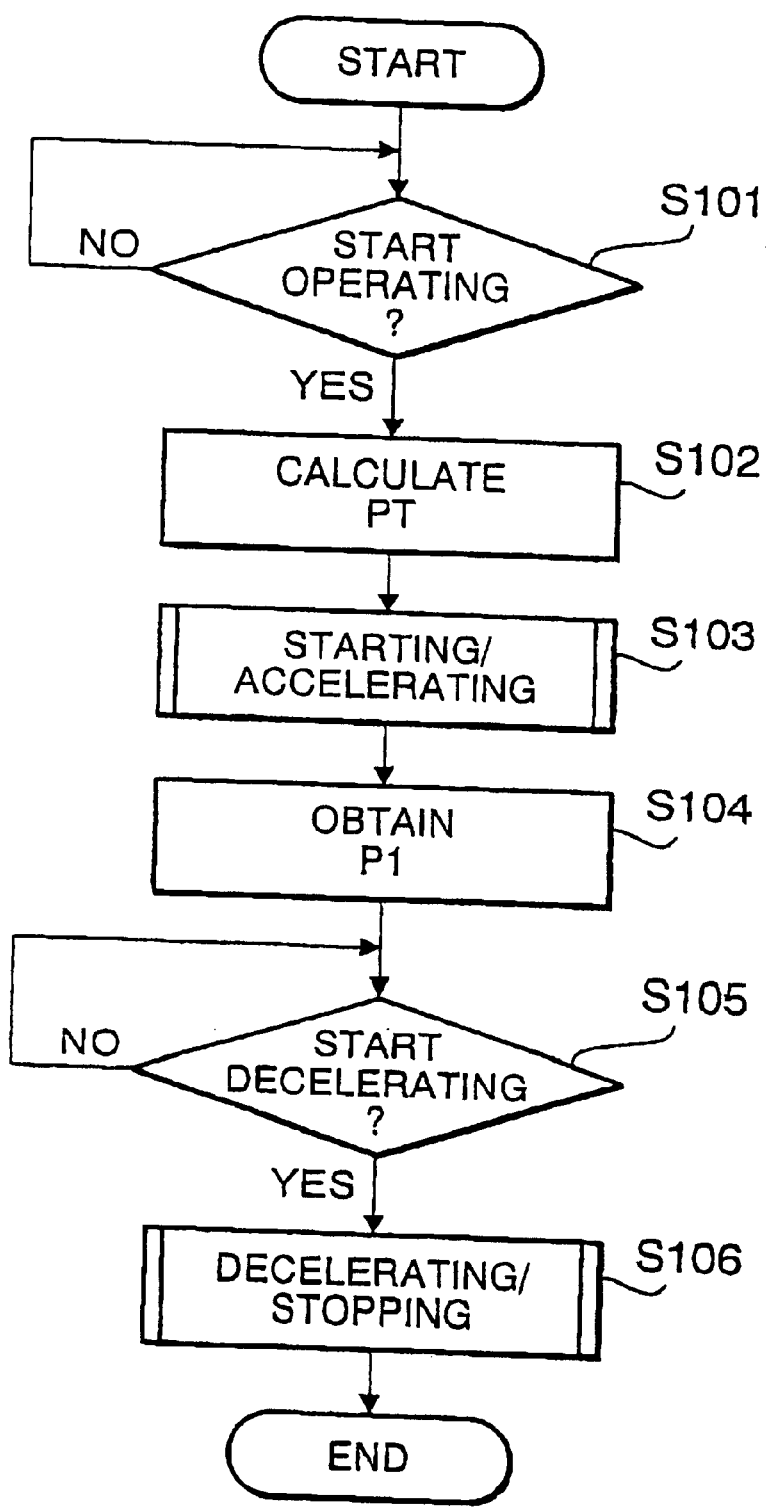
FIG. 3 is a flowchart illustrating main procedure of the lens driving system shown in FIG. 2.

FIG. 3 is a flowchart illustrating a main procedure of the AF lens driving device 1 executed by the CPU 20.

At S101, the CPU 20 determines whether the operation is to be started. The operation may be started, for example, when a shutter button of the camera is depressed halfway and a distance to an object is measured by the distance measuring device 21 of the camera. If the operation is to be executed (S101: YES), the CPU 20 calculates a rotation angle of the focusing cam ring 2 based on a current position and a target position of the focusing lens 3 (see FIG. 4). It should be noted that the target position is an in-focus position, at which an in-focus image of an object is obtained. By rotating the focusing cam ring 2 by an amount calculated at S101, the focusing lens 3 is moved from the current position to the target position.

Figure 4:
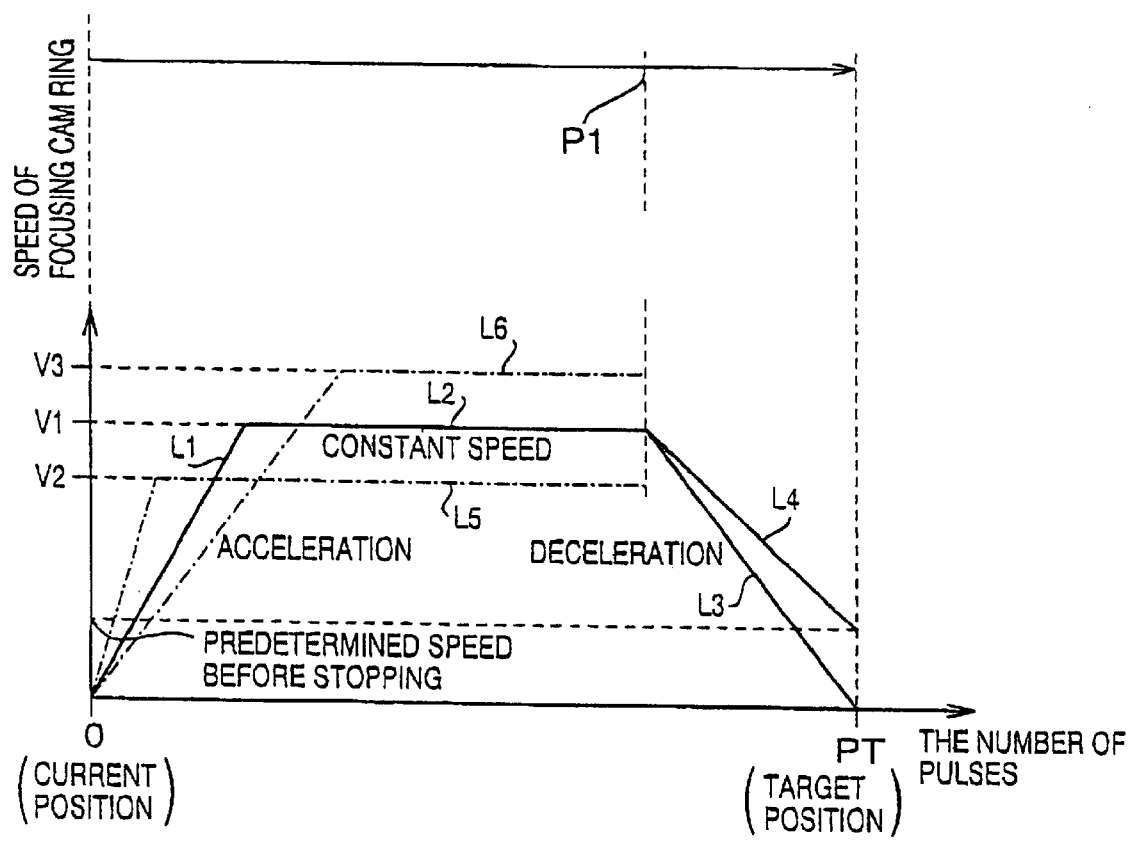
FIG. 4 is a chart illustrating a control program of the lens driving system.

Then, the CPU 20 determines the number PT of pulses to be included in the pulse signal output by the focusing encoder 11 corresponding to the rotation angle calculated above (S102). At S103, a starting/accelerating operation is executed. An AF motor 5 of the AF actuator 4 is started to rotate, thereby an AF gear 6 is rotated. Then, through the friction gear mechanism 7, the focusing cam ring 2 is rotated. Further, the rotation speed of the AF motor 5 is accelerated until the rotation speed thereof reaches a predetermined target speed as shown by line L1 in FIG. 4. It should be noted that FIG. 4 shows a rotation speed of the focusing cam ring 2. If the MF ring 9 is not operated during the starting/accelerating procedure, when the AF motor 5 rotates at the target speed, the focusing cam ring 2 rotates at the predetermined constant speed V1 as shown in FIG. 4. If the MF ring 9 is being operated during the starting/accelerating procedure, the speed of the focusing cam ring 2 is determined by the sum of the effects of the rotation of the AF motor 5 and the rotation of the MF ring 9. That is, if the MF ring 9 is operated in an opposite direction with respect to the AF motor 5, the constant speed (e.g., L5 in FIG. 4) of the focusing cam ring 2 is slower than V1, e.g., V2 shown in FIG. 4. If the MF ring 9 is rotated in the same direction as the AF motor 5, the constant speed (e.g., L6 in FIG. 4) of the focusing cam ring 2 is higher than V1, e.g., V3 shown in FIG. 4.

Then, the CPU 20 calculates the number P1 of the pulses, which is to be output by the focusing pulse encoder 11, to be counted before deceleration of the AF motor 5 is to be started based on the speed of the AF motor (i.e., the target speed) and the rotation amount of the focusing ring 2 until the AF motor 5 is stopped (S104). The rotation speed of the AF motor 5 is maintained at the target speed until the number of the pulses, which are output by the focusing pulse encoder 11, reaches the number P1 calculated above. When the number of pulses has reached the number P1 (S105: YES), a decelerating/stopping procedure is called (S106), where the AF motor 5 is decelerated at a predetermined deceleration ratio, and when the number of pulses as counted has reached the number PT calculated at S102, the AF motor 5 is stopped. It should be noted that, even if the speed of the rotation of the AF motor 5 is not zero, if the speed is slower than a predetermined speed before stopping when the number of the pulses has reached the number PT, the focusing lens will be stopped at the target position. Thus, in FIG. 4, deceleration of the focusing cam ring 2 is represented by two lines L3 and L4. The speed of the AF motor 5 is to be controlled such that the speed of the focusing cam ring 2 is represented by a line located between the two lines L3 and L4, which represent the deceleration, in FIG. 4.

Figure 5:
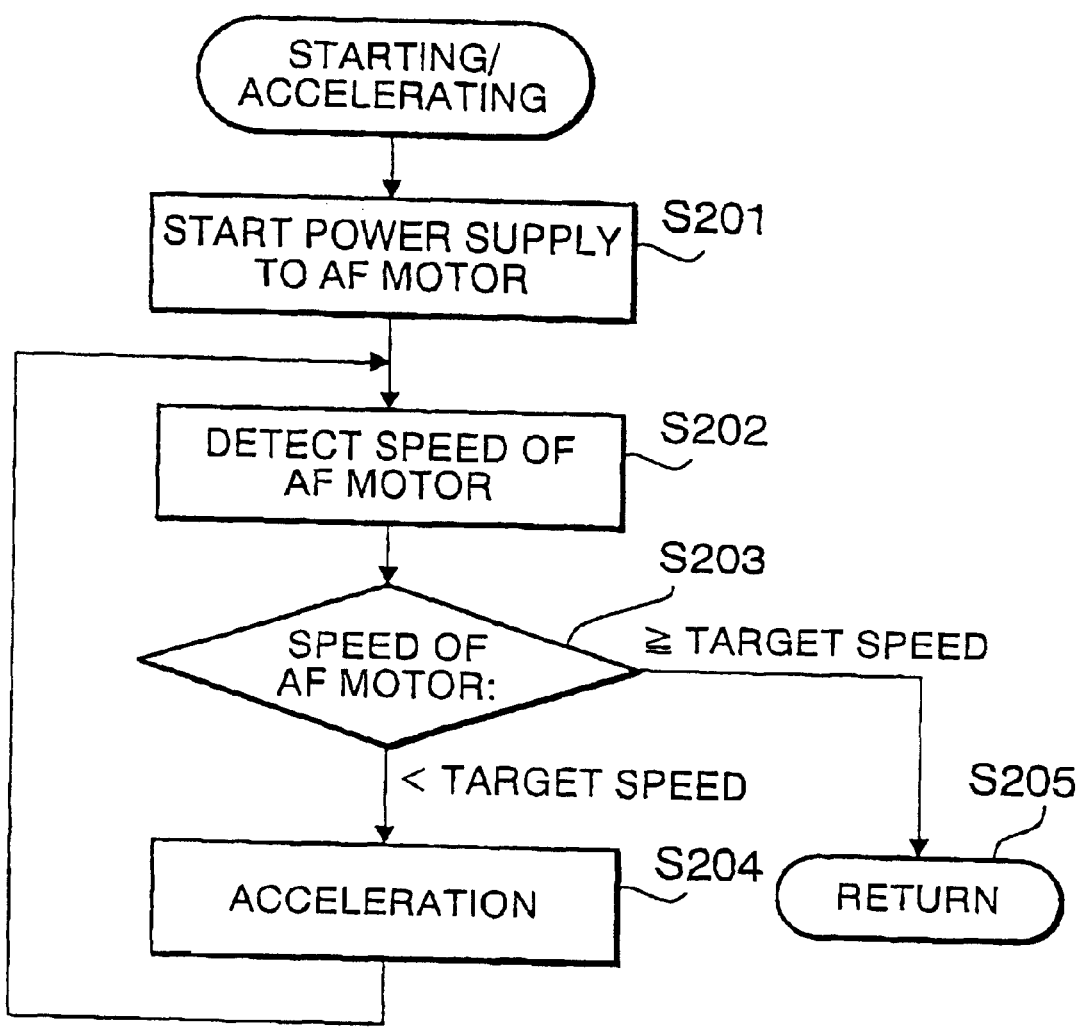
FIG. 5 is a flowchart illustrating a starting/accelerating procedure.

FIG. 5 is a flowchart illustrating the starting/accelerating procedure, which is called at step S103 in FIG. 3.

The CPU 20 starts supplying the electrical power to the AF motor 5 (S201), and detects the rotation speed of the AF motor 5 based on the pulse signal output by the AF pulse encoder 13 (S202). The detection of the rotation speed is done by detecting a width of each pulse included in the pulse signal output by the AF pulse encoder 13. Alternatively, the rotation speed may be detected by counting the number of pulses included in the pulse signal, which is output by the AF pulse encoder 13, within a unit period of time, or by detecting a period of the pulse signal. Then, the detected rotation speed is compared with the predetermined constant speed (i.e., the target speed) (S203). If the detected rotation speed is slower than the target speed, the CPU 20 controls the motor driver 22 so that the AF motor 5 is accelerated. When the rotation speed of the AF motor 5 has reached the target speed, the acceleration is terminated, and the subroutine is terminated. Thus, the AF motor 5 is maintained to rotate at the target speed. As described above, if the MF ring 9 is kept operated during the starting/accelerating procedure, when the AF motor 5 is accelerated up to the target speed, the focusing cam ring 2 rotates at a speed that is different from the predetermined constant speed as shown in FIG. 4.

Figure 6:
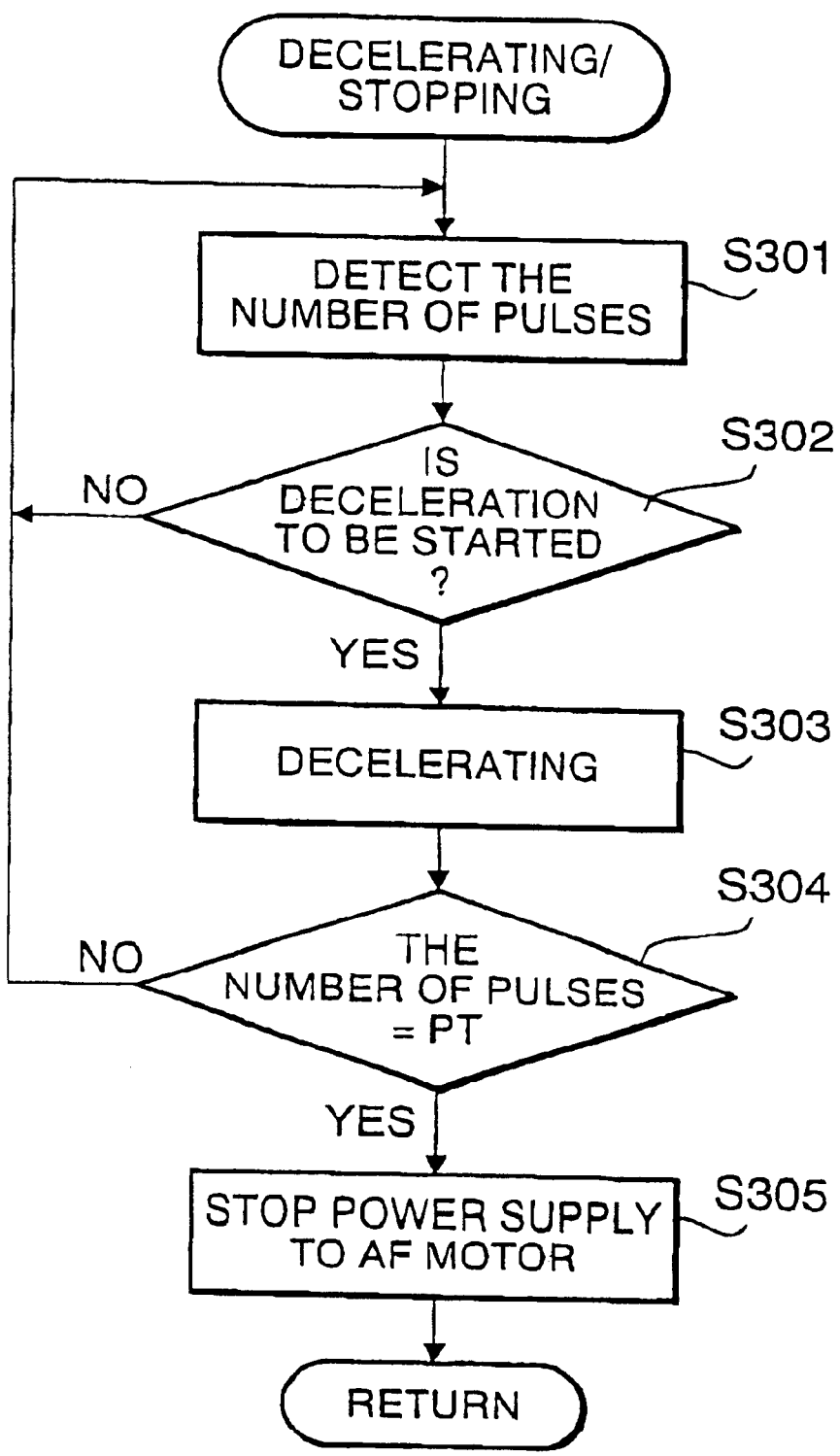
FIG. 6 is a flowchart illustrating a decelerating/stopping procedure.

FIG. 6 is a flowchart illustrating the decelerating/stopping procedure, which is called at S106 in FIG. 3.

When the AF motor 5 is driven, the CPU 20 counts the number of pulses included in the pulse signal output by the focusing pulse encoder 11 (S301). If the number of pulses reaches the number at which the deceleration is to be started (S302: YES), that is the number of the pulses has reached P1, the CPU 20 controls the motor driver 22 to start deceleration of the AF motor 5 (S303). In this deceleration procedure, similarly to the starting/accelerating procedure, based on the pulse signal output by the AF pulse encoder 13, the rotation speed of the AF motor 5 is detected. Further, based on the number of pulses included in the pulse signal output by the focusing pulse encoder 11, the number of pulses until the focus ring 2 is stopped is calculated. Furthermore, a deceleration ratio is calculated based on the current rotation speed of the AF motor 5, and with respect to the deceleration ratio, in accordance with the counted number of pulses included in the pulse signal output by the focusing pulse encoder 11, the motor driver 22 is controlled such that the rotation speed of the AF motor 5 is gradually decreased.

For example, every time the number of pulses included in the pulse signal output by the focusing pulse encoder 11 is counted, the rotation speed of the AF motor 5 is decreased by a predetermined amount. Then, the number of the counted pulses included in the pulse signal output by the focusing pulse encoder 11 and the calculated number PT of the pulses are compared. When the number of counted pulses of the pulse signal output by the focusing pulse encoder 11 has reached the total number PT of pulses (S304: YES), the rotation speed of the AF motor 5 is set to zero, or at least to a speed at which the overrun will not occur when the power supply is terminated, then the electric power supply to the AF motor 5 is terminated (S305). Thus, the decelerating/stopping procedure is finished.

As above, in the starting/acceleration procedure, the rotation speed of the AF motor 5 is detected based on the pulse signal output by the AF pulse encoder 13.

With this configuration, the AF motor 5 is controlled, in accordance with the applied electrical current, to be accelerated at a predetermined acceleration ratio, and to reach the predetermined constant speed within a predetermined period of time, regardless of the rotation direction and/or speed of the focusing cam ring 2 and the MF ring 9. Therefore, even if the MF ring 9 is operated, when the AF motor 5 is started to rotate and/or accelerate, in the same or opposite direction of the rotation direction of the focusing cam ring 2, and the rotation direction and/or speed of the focusing cam ring 2 is changed, when the MF ring 9 is stopped, the rotation speed of the AF motor 5 is fixed, and the rotation speed of the focusing cam ring 2 is changed to the speed corresponding to that of the AF motor 5 immediately, and therefore the speed is accelerated to a predetermined constant speed. That is, focusing by the focusing cam ring 2 is not affected by the operation of the MF ring 9.

For example, FIGS. 7A–7D show a timing chart at the time of starting/accelerating. The AF motor 5 is controlled so that the rotation speed thereof reaches the target speed at time T. FIG. 7A shows the pulse signal output by the AF pulse encoder 13, and FIGS. 7B–7D show the pulse signals output by the focusing pulse encoder 11. FIG. 7B shows a case where the MF ring 9 is not operated, FIG. 7C shows a case where the MF ring 9 is operated at a fixed speed in the direction opposite to that of the focusing cam ring 2, and FIG. 7D shows a case where the MF ring 9 is operated at a fixed speed in the direction the same as that of the focusing cam ring 2. In FIG. 7C, during periods T11, only the MF ring 9 is rotated. During periods T12, the AF motor 5 is rotated with the MF ring 9 kept rotated in the opposite direction. In period T12, the focusing cam ring 2 rotates in a direction opposite to that of the AF motor 5. Therefore, the output of the focusing pulse encoder 11 gradually delays within period T12. During period T13, the rotation direction of the focusing cam ring 2 reverses, i.e., coincides with the rotation direction of the AF motor 5 and accelerated. In this case, therefore, when time T has elapsed, the constant rotation speed of the focusing cam ring 2 is V2, which is slower than the speed V1 when the MF ring 9 is not operated (see FIG. 4). In FIG. 7D, during periods T21, only the MF ring 9 is rotated. During periods T22, the AF motor 5 is rotated with the MF ring 9 kept rotated in the same direction. In period T22, the focusing cam ring 2 rotates faster than a case where the MF ring 9 is not operated as shown in FIG. 7B. Therefore, the output of the focusing pulse encoder 11 accelerated faster than the case shown in FIG. 7B. As a result, when time T has elapsed, the constant rotation speed of the focusing cam ring 2 is V3, which is faster than the speed V1 when the MF ring 9 is not operated (see FIG. 4).

As is known from FIGS. 7A–7D, since the AF motor 5 is driven based on the pulse signal output by the AF encoder 13, even if the rotation speed of the focusing cam ring 2 is not constant as shown in FIGS. 7C and 7D, the AF motor 5 is rotated such that the predetermined rotation speed of the AF motor 5 is achieved within the predetermined period of time T. Therefore, if the operation of the MF ring 9 is terminated, the rotational force of the AF motor 5 is transmitted to the focusing cam ring 2 through the friction gear mechanism 7, and thereby the rotation of the focusing cam ring 2 coincides with the rotation of the AF motor 5, and thus, the operation can transit from the MF operation to the AF operation smoothly.

FIGS. 8A–8F show a timing chart when the AF motor is decelerated/stopped, i.e., the rotation of the AF motor 5 is started to be decelerated, and through the AF gear 6, the rotation speed of the focusing cam ring 2 is decelerated. FIGS. 8A, 8C and 8E show pulse signals output by the AF pulse encoder 13, and FIGS. 8B, 8D and 8F show pulse signals output by the focusing pulse encoder 11. In this example illustrated with reference to FIGS. 8A–8F, the AF motor 5 is decelerated and stopped when the focusing pulse encoder 11 outputs 13 pulses.

As shown in FIGS. 8A and 8B, if the MF ring 9 is not operated, the rotation speed of the focusing cam ring 2 is decelerated as the AF motor 5 is decelerated, and the AF motor 5 is stopped at time T1.

If the MF ring 9 is operated in the opposite direction, as shown in FIGS. 8C and 8D, the deceleration ratio of the focusing cam ring 2 is lowered, and counting of the number of pulses included in the pulse signal output by the focusing pulse encoder 11 is delayed. Due to this delay, the deceleration ratio of the rotation speed of the AF motor 5 is also lowered, and thus, the rotation speed of the AF motor 5 corresponds to the rotation speed of the focusing cam ring 2. If the operation of the MF ring 9 is stopped thereafter, the AF motor 5 is decelerated from the speed when the operation of the MF ring 9 is stopped. At this stage, the rotation speed of the AF motor 5 corresponds to the rotation speed of the focusing cam ring 2, and therefore, the decelerating of the AF motor 5 and the focus ring 2 can be performed smoothly.

In other words, during period T31, since the MF ring 9 is not operated, the pulse signal during this period is the same as the signal shown in FIG. 8A. During period T32, since the MF ring 9 is rotated in the direction opposite to the rotation direction of the focusing cam ring 2, the interval of pulses is elongated. Since the number of the pulses does not reach 13 at time T1, the AF motor 5 is kept rotated. When the operation of the MF ring 9 is finished, the AF motor 9 remains operated until the number of pulses reaches 13 (during T33), and then, at T2, the AF motor 5 is stopped. Thus, in this case, the duration during which the deceleration operation is executed is longer than a case where the MF ring 9 is not operated, i.e., T2 is greater than T1. Although the deceleration operation takes longer period as shown in FIG. 8D, since the rotation of the AF motor is controlled in accordance with the number of the pulses included in the pulse signal output by the focusing pulse encoder 11, the movement of the focusing lens 3 can be controlled accurately.

As shown in FIGS. 8E and 8F, if the MF ring 9 is operated in the same direction as the rotation direction of the focusing cam ring 2, the deceleration rate of the focusing cam ring 2 is increased, and the counting of the pulses included in the pulse signal output by the focusing pulse encoder 11 progresses. Then, the deceleration rate of the rotation speed of the AF motor 5 is increased, and thus the AF motor 5 rotates in correspondence with the rotation of the focus ring 2. Thus, if the rotation of the MF ring 9 is stopped, the deceleration of the AF motor 5 is started from the rotation speed at the time when the MF ring 9 is stopped. Since the rotation speed of the AF motor 5 corresponds to the rotation speed of the focusing cam ring 2 at this stage, the smooth deceleration of the AF motor 5 and the focusing cam ring 2 can be achieved, and the focusing lens can be positioned at the target position accurately.

In other words, during period T41, since the MF ring 9 is not operated, the pulse signal during this period is the same as the signal shown in FIG. 8A. During period T42, since the MF ring 9 is rotated in the direction same as the rotation direction of the focusing cam ring 2, the interval of pulses is shortened. After the operation of the MF ring 9 in period T42 is finished, the AF motor 9 remains operated until the number of pulses reaches 13 (during T43), and then, at T3, the AF motor 5 is stopped. Thus, in this case, the duration during which the deceleration operation is executed is shorter than the case where the MF ring 9 is not operated, i.e., T3 is smaller than T1. Although the deceleration operation takes shorter period as shown in FIG. 8F, since the rotation of the AF motor is controlled in accordance with the number of the pulses included in the pulse signal output by the focusing pulse encoder 11, the movement of the focusing lens 3 can be controlled accurately.

In the embodiment, the starting/accelerating of the AF motor 5 is controlled based on the pulse signal output from the AF pulse encoder 13. The deceleration can be controlled based on the pulse signal output by the AF pulse encoder 13 within a predetermined period of time. If the MF ring 9 is operated when the AF motor is being decelerated, since the rotation speed of the focusing cam ring 2 changes, a period of time within which the number of pulses reaches the predetermined value varies. As a result, if the reached time is earlier than a time which was determined when the MF ring 9 was not operated, it becomes impossible to decelerate the speed to a target speed, which results in a overrun or rebound when the motor is stopped. On the contrary, if the reached time is later than the determined time, the speed reaches the target speed (i.e., a slower speed) before the AF motor 5 is stopped. In this case, the AF motor 5 is driven to keep rotating slowly.

In the above-described embodiment, a DC motor is used for the AF motor 5. In order to detect the rotation speed of the AF motor 5, the AF pulse encoder is employed. Instead of the DC motor, an ultrasonic motor can be used as the AF motor. In this case, by detecting the amplitude of the signal output by sensor terminals incorporated in the ultrasonic motor, rotation status of the ultrasonic motor can be known. Therefore, if the ultrasonic motor is used for the AF motor, the AF pulse encoder 13, which was necessary when the AF motor is a DC motor, can be omitted. Such a structure, therefore, is advantageous for a compact, simple and light-weight lens barrel structure. Still alternatively, even if the DC motor is used for the AF motor, if a PWM (pulse width modulation) control is applied for driving the motor, and characteristics of the rotation speed with respect to the pulse width of the applied pulse signal, the rotation of the AF motor can be controlled without the AF pulse encoder.

If the focusing pulse encoder 11 is constituted such that more than one pulse signals at shifted phase are generated simultaneously, the rotation direction of the focus ring can be detected from the pulse signals. Then, if the focus ring rotates in a direction opposite to the target direction by the operation of the MF ring, the amount is cancelled to prevent the under-run thereof.

The present disclosure relates to the subject matter contained in Japanese Patent Application No. HEI 11-258811, filed on Sep. 13, 1999, which is expressly incorporated herein by reference in its entirety.

What is claimed is:

1. A lens driving device for driving a focusing lens of a photographing lens for a camera, comprising:

an actuator that is driven to move the focusing lens, said actuator including a motor;

an operable member that is manually operable to move the focusing lens, said operable member being operable even when said actuator is driven to move the focusing lens;

a first detector that detects a driving amount of the focusing lens;

a second detector that detects a driving speed of said motor; and a speed controller that controls a driving speed of said actuator in accordance with detection outputs of said first and second detectors.

2. A lens driving device for driving a focusing lens of a photographing lens for a camera, comprising:

an actuator that is driven to move the focusing lens, said actuator including a motor;

an operable member that is manually operable to move the focusing lens, said operable member being operable even when said actuator is driven to move the focusing lens;

a first detector that detects a driving amount of the focusing lens;

a second detector that detects a driving speed of said motor; and a speed controller that controls a driving speed of said actuator, wherein said controller controls said actuator in accordance with a detection output of said second detector when the focusing lens is started/accelerated, and wherein said controller controls said actuator in accordance with detection outputs of said first and second detectors when the focusing lens is decelerated/stopped.

3. The lens driving device according to claim 2, wherein said first detector includes:

a focusing ring that is rotated to move the focusing lens; and a focusing pulse encoder that outputs a pulse signal including pulses corresponding to the rotation amount of said focusing ring, wherein said controller counts the number of pulses included in said pulse signal output by said focusing pulse encoder and detects the driving amount of the focusing lens in accordance with the counted number of pulses.

4. The lens driving device according to claim 3, wherein said focusing pulse encoder outputs a plurality of pulse signals having different phases, said controller detecting a driving direction of the focusing lens based on said plurality of pulse signals.

5. The lens driving device according to claim 2, wherein said second detector includes an AF (autofocusing) pulse encoder that detects the rotation speed of said motor and outputs an AF pulse signal representing the rotation speed of said motor, wherein said controller detects the driving speed of said actuator in accordance with the AF pulse signal.

6. The lens driving device according to claim 5, wherein said controller detects the driving speed of said actuator in accordance with one of the number of pulses, the width of pulses, and the frequency of said AF pulse signal.

* * * * *